United States Patent
Takahashi

(10) Patent No.: US 8,527,141 B2
(45) Date of Patent: Sep. 3, 2013

(54) SENSOR CALIBRATION DEVICE, AND SENSOR CALIBRATION METHOD

(75) Inventor: Yoshihiko Takahashi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 147 days.

(21) Appl. No.: 12/627,295

(22) Filed: Nov. 30, 2009

(65) Prior Publication Data

US 2010/0168957 A1 Jul. 1, 2010

(30) Foreign Application Priority Data

Dec. 25, 2008 (JP) ................................. 2008-331373

(51) Int. Cl.
*G05B 13/02* (2006.01)
*G06F 19/00* (2011.01)

(52) U.S. Cl.
USPC ............... 701/34; 701/26; 701/28; 701/41; 701/45; 701/207; 701/208; 701/217; 701/301

(58) Field of Classification Search
None
See application file for complete search history.

(56) References Cited

U.S. PATENT DOCUMENTS

| | | | | |
|---|---|---|---|---|
| 4,954,962 A * | 9/1990 | Evans et al. | ...................... | 701/28 |
| 5,559,695 A * | 9/1996 | Daily | ................................ | 701/1 |
| 5,588,733 A * | 12/1996 | Gotou | ............................. | 362/37 |
| 5,877,680 A * | 3/1999 | Okuchi et al. | ................. | 340/468 |
| 5,896,011 A * | 4/1999 | Zillgitt | ............................ | 315/82 |
| 5,962,980 A * | 10/1999 | Kluge et al. | ..................... | 315/82 |
| 6,193,398 B1 * | 2/2001 | Okuchi et al. | ................ | 362/466 |
| 6,229,263 B1 * | 5/2001 | Izawa | ............................... | 315/80 |
| 6,501,910 B2 * | 12/2002 | Kindaichi | ........................ | 396/96 |
| 6,718,133 B2 * | 4/2004 | Nakata et al. | .................... | 396/96 |
| 6,778,928 B2 * | 8/2004 | Stiller | ........................... | 702/104 |
| 6,915,228 B2 * | 7/2005 | Uffenkamp et al. | ............ | 702/94 |
| 7,130,448 B2 * | 10/2006 | Nagaoka et al. | .............. | 382/104 |
| 2002/0048027 A1 * | 4/2002 | Pettersen et al. | .............. | 356/614 |
| 2003/0028291 A1 * | 2/2003 | Matsuura | ........................... | 701/1 |
| 2003/0107323 A1 * | 6/2003 | Stam | ................................ | 315/82 |
| 2003/0185017 A1 * | 10/2003 | Ishida et al. | ................... | 362/539 |
| 2005/0068782 A1 * | 3/2005 | Sugimoto et al. | ............. | 362/475 |
| 2005/0162638 A1 * | 7/2005 | Suzuki et al. | ................. | 356/4.04 |

FOREIGN PATENT DOCUMENTS

| | | |
|---|---|---|
| DE | 10 2004 028 090 A1 | 12/2005 |
| EP | 1 909 064 A1 | 4/2008 |
| JP | 8-278368 | 10/1996 |
| JP | 2000-75032 | 3/2000 |

(Continued)

OTHER PUBLICATIONS

Japanese Office Action issued on Jan. 11, 2011, in the corresponding Japanese Patent Appliction No. 2008-331373 (with Partial English Translation).

(Continued)

*Primary Examiner* — Ian Jen
(74) *Attorney, Agent, or Firm* — Oblon, Spivak, McClelland, Maier & Neustadt, L.L.P.

(57) ABSTRACT

A sensor calibration ECU includes: a calibratability determination portion that determines whether or not a distance image sensor is in a calibratable state on the basis of at least one of the state of a vehicle and the state of a road surface on which the vehicle is positioned; and a calibration execution portion that calibrates the distance image sensor on the basis of a pre-found distance (=reference distance) between the distance image sensor and the road surface on which the vehicle is positioned, when it is determined by the calibratability determination portion that the distance image sensor is in the calibratable state.

15 Claims, 9 Drawing Sheets

(56) References Cited

FOREIGN PATENT DOCUMENTS

| | | |
|---|---|---|
| JP | 2003-57345 | 2/2003 |
| JP | 2005-214743 | 8/2005 |
| JP | 2007-132848 | 5/2007 |

OTHER PUBLICATIONS

Office Action issued Jun. 5, 2013, in German Patent Application No. 10 2009 055 101.8 (with Partial English-language Translation).

* cited by examiner

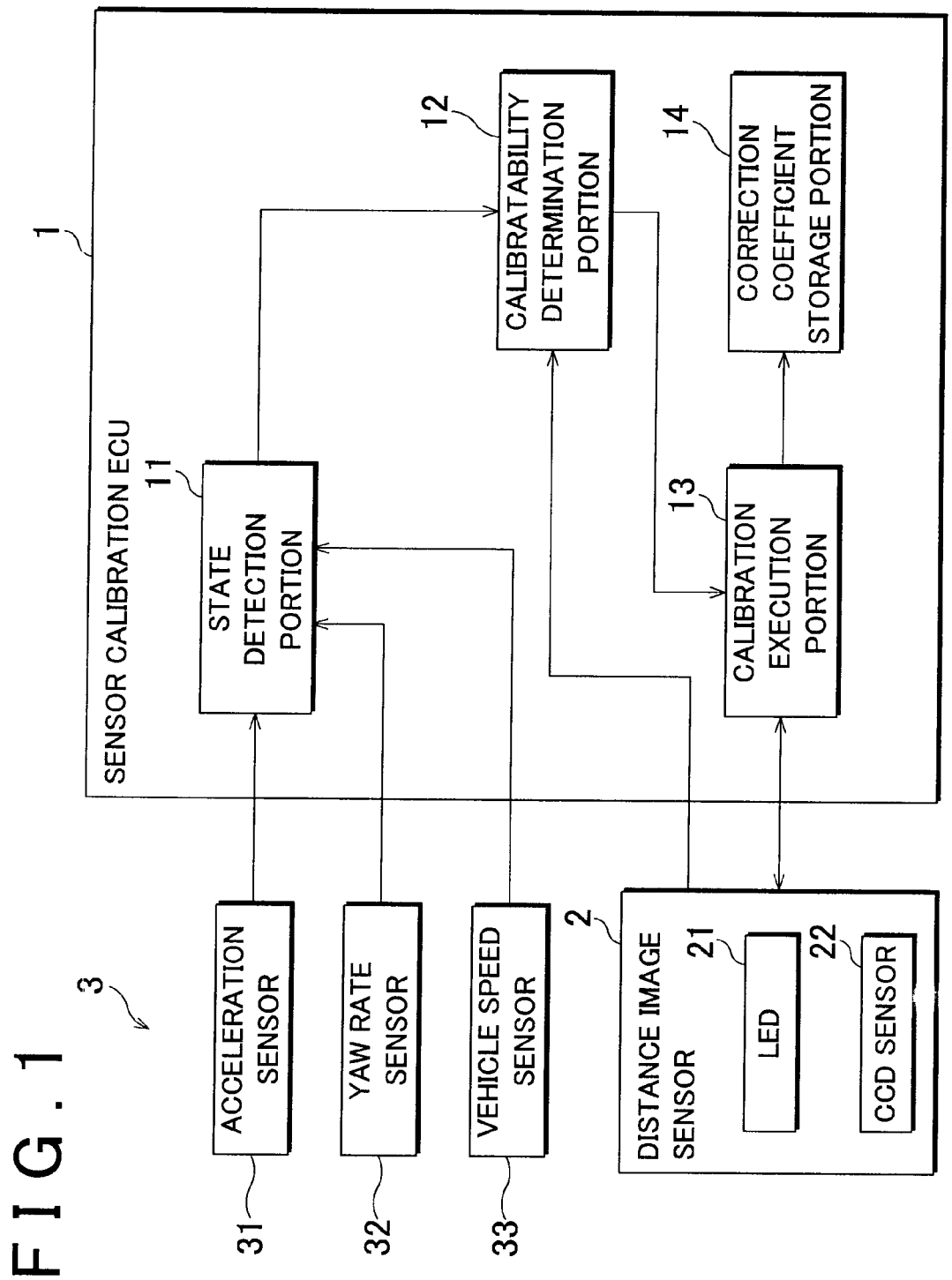

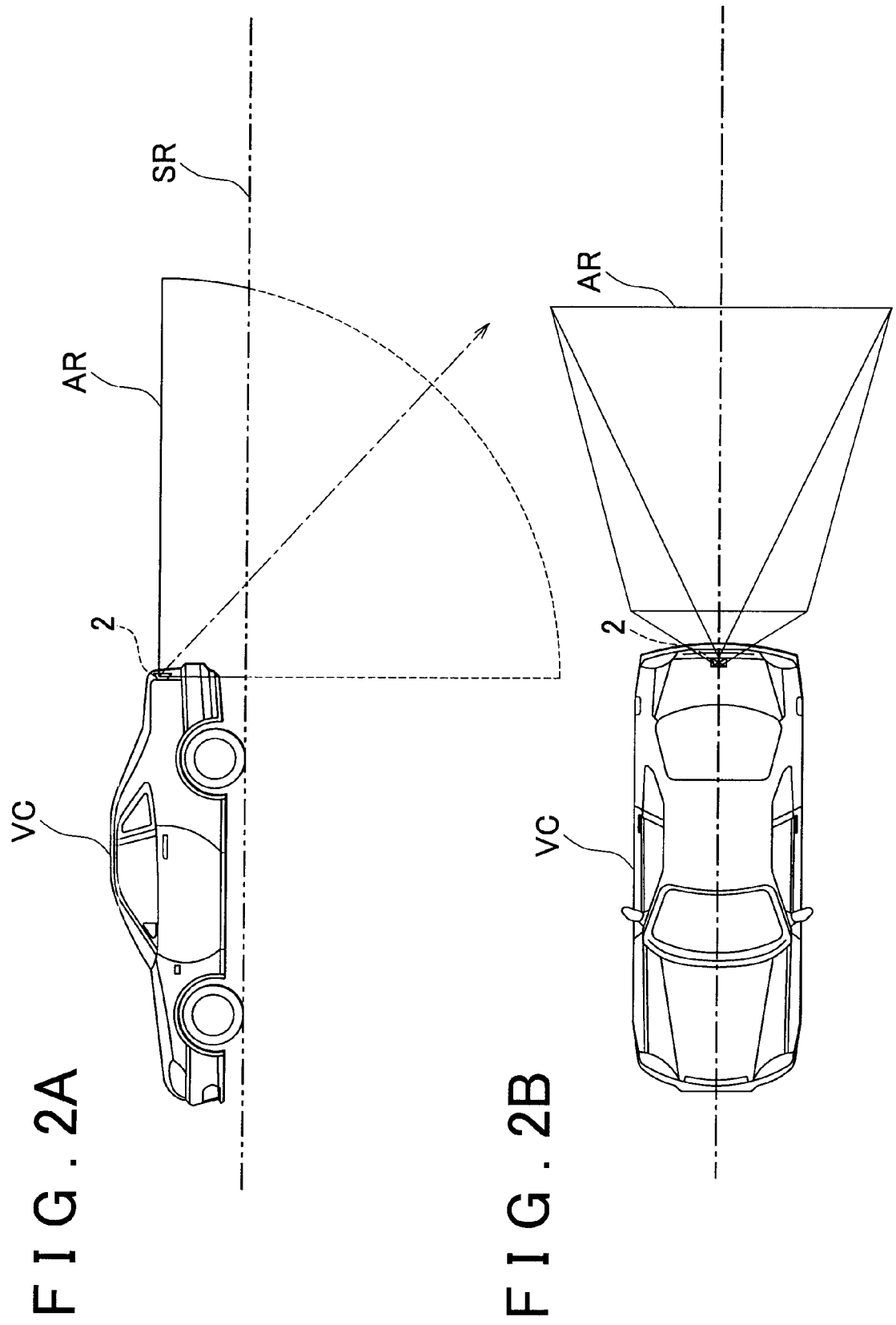

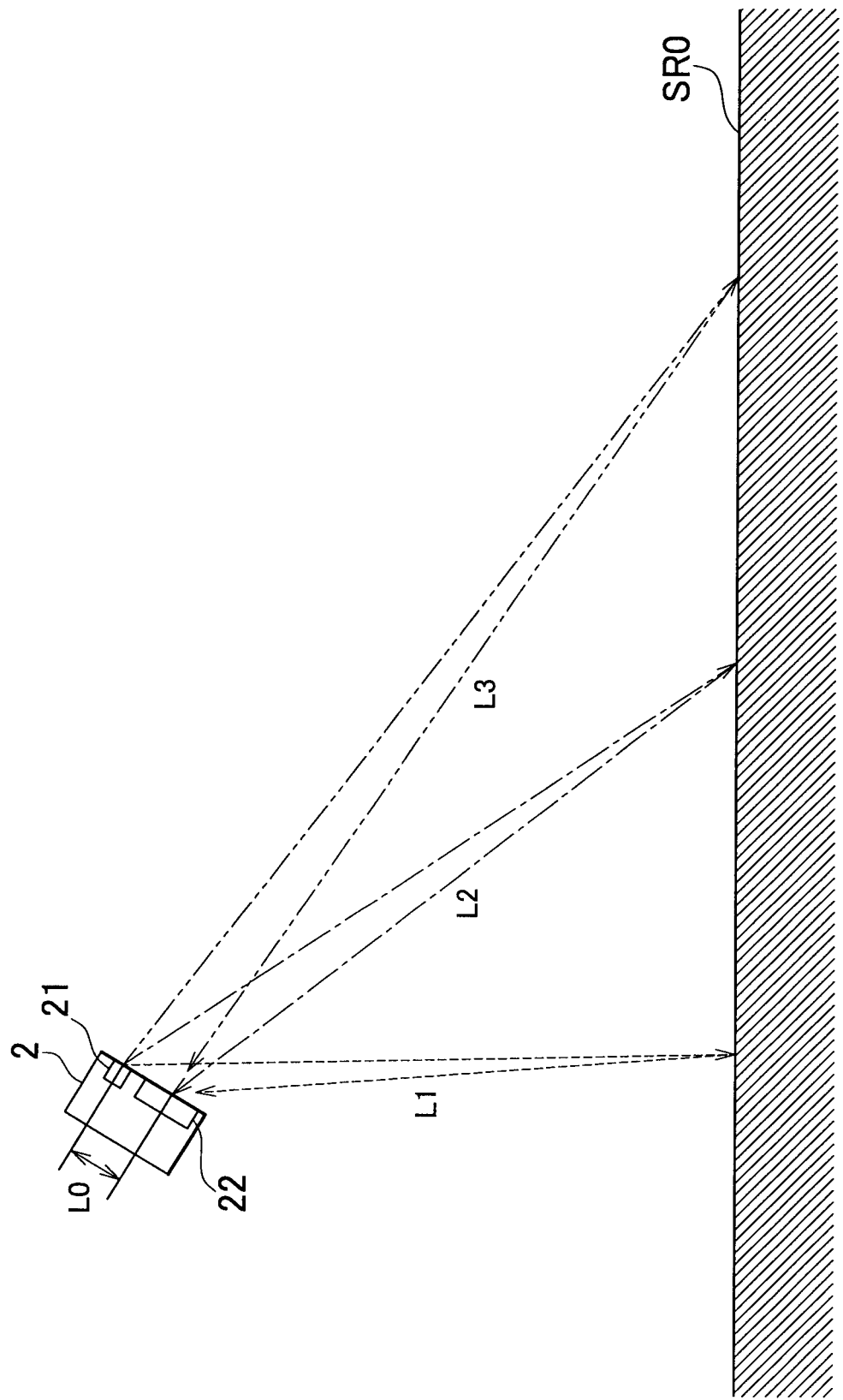

FIG. 6

| CELL ID NO. | LOW-BRIGHTNESS CORRECTION COEFFICIENT | | | HIGH-BRIGHTNESS CORRECTION COEFFICIENT | | |
|---|---|---|---|---|---|---|
| | BRIGHTNESS $\gamma$ | SLOPE A | INTERCEPT B | BRIGHTNESS $\gamma$ | SLOPE A | INTERCEPT B |
| 1 | $\gamma 11$ | A11 | B11 | $\gamma 12$ | A12 | B12 |
| 2 | $\gamma 21$ | A21 | B21 | $\gamma 22$ | A22 | B22 |
| 3 | $\gamma 31$ | A31 | B31 | $\gamma 32$ | A32 | B32 |
| ... | ... | ... | ... | ... | ... | ... |

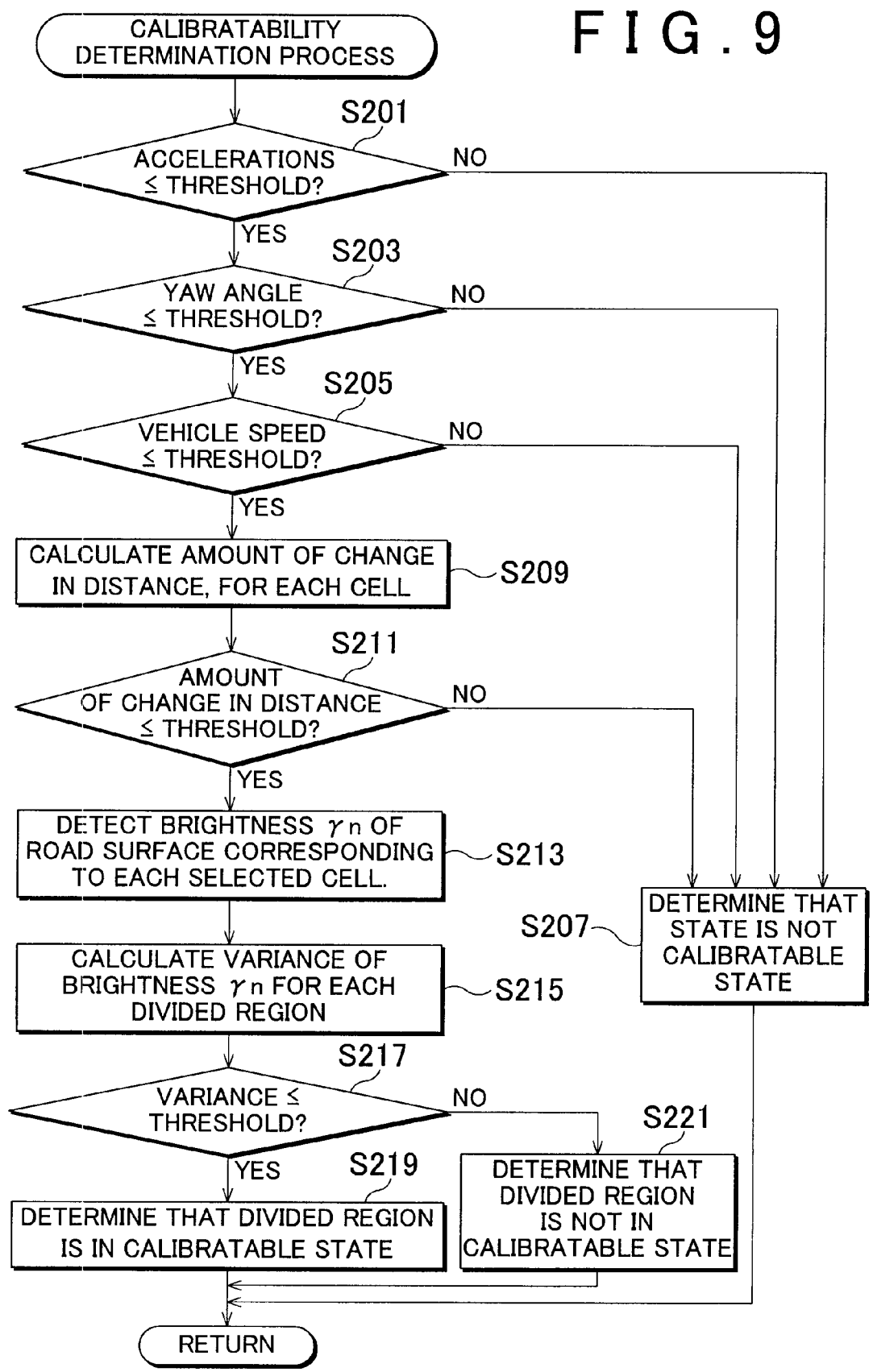

SENSOR CALIBRATION DEVICE, AND SENSOR CALIBRATION METHOD

INCORPORATION BY REFERENCE

The disclosure of Japanese Patent Application No. 2008-331373 filed on Dec. 25, 2008 including the specification, drawings and abstract is incorporated herein by reference in its entirety.

BACKGROUND OF THE INVENTION

1. Field of the Invention

The invention relates to a sensor calibration device and a sensor calibration method for calibrating, for example, a distance-measuring sensor that is mounted in a vehicle. In particular, the invention relates to a sensor calibration device and a sensor calibration method for calibrating a distance image sensor that is mounted in a vehicle.

2. Description of the Related Art

A TOF (time of flight) method that calculates the distance to a measurement object by measuring the time required for the round trip of light to the measurement object is widely known as a distance measurement method. Besides, there is developed a distance image sensor that obtains distance information by the TOF method by processing photoelectric current prior to the voltage conversion of a light reception signal, via a photogate that has a common CCD (charge coupled device) structure.

For example, an optical distance measurement device that obtains an accumulated differential signal from an Ach signal from a first accumulation element and a Bch signal from a second accumulation element by a differential computation portion is disclosed (see Japanese Patent Application Publication No. 2007-132848 (JP-A-2007-132848)). According to the optical distance measurement device described in Japanese Patent Application Publication No. 2007-132848 (JP-A-2007-132848), since the differential computation with the Ach signal and the Bch signal is performed, noise components, such as background light and the like, can be appropriately removed, and only a signal component that is needed for the calculation of the distance to the measurement object can be extracted and accumulated. Therefore, the device is able to perform highly accurate computation of distance in an environment with strong background light.

However, in the optical distance measurement device described in Japanese Patent Application Publication No. 2007-132848 (JP-A-2007-132848), since the photoelectric conversion element, such as a CCD or the like, that accumulates charges that correspond to the amount of light received changes its characteristics depending on the outside air temperature or the like, it is necessary to frequently calibrate the photoelectric conversion element in order to maintain good detection accuracy.

SUMMARY OF THE INVENTION

The invention provides a sensor calibration device and a sensor calibration method that are capable of properly and easily calibrating a distance-measuring sensor such as a distance image sensor or the like.

A first aspect of the invention is a sensor calibration device that calibrates a distance-measuring sensor that is mounted in a vehicle, and includes a calibratability determination portion, and a calibration execution portion. The calibratability determination portion determines whether or not the distance-measuring sensor is in a calibratable state based on at least one of state of the vehicle and state of a road surface on which the vehicle is positioned. The calibration execution portion calibrates the distance-measuring sensor based on a pre-found distance between the distance-measuring sensor and the road surface on which the vehicle is positioned, when it is determined by the calibratability determination portion that the distance-measuring sensor is in the calibratable state.

That is, since it is determined whether or not the distance-measuring sensor is in the calibratable state on the basis of at least one of the state of the vehicle and the state of the road surface on which the vehicle is positioned, it can be properly determined whether or not the distance-measuring sensor is in the calibratable state. Furthermore, the distance-measuring sensor is calibrated on the basis of the pre-found distance between the distance-measuring sensor and the road surface on which the vehicle is positioned. Therefore, the distance-measuring sensor, such as a distance image sensor or the like, can be properly and easily calibrated.

The calibratability determination portion may determine whether or not the distance-measuring sensor is in the calibratable state according to whether or not the vehicle is substantially parallel to the road surface.

With this construction, it can be properly determined whether or not the distance-measuring sensor is in the calibratable state.

That is, in the case where the vehicle is substantially parallel to the road surface, the distance-measuring sensor can be calibrated by using the pre-found distance between the distance-measuring sensor and the road surface that has been found on the supposition that the vehicle is parallel to a flat road surface.

The distance-measuring sensor may be a distance image sensor at least a portion of whose detection region is the road surface, and the calibratability determination portion may determine whether or not the distance image sensor is in the calibratable state based on a result of detection by the distance image sensor.

With this construction, since it is determined whether or not the distance image sensor is in the calibratable state on the basis of a result of detection by the distance image sensor, there is no need to dispose a sensor other than the distance image sensor. Therefore, the distance-measuring sensor (the distance image sensor, in this case) can be more easily calibrated.

The calibratability determination portion may determine whether or not the vehicle is substantially parallel to the road surface based on the result of detection by the distance image sensor, and then may determine whether or not the distance image sensor is in the calibratable state according to a result of determination as to whether or not the vehicle is substantially parallel to the road surface.

With this construction, in the case where the vehicle is substantially parallel to the road surface, the distance-measuring sensor can be calibrated by using the pre-found distance between the distance-measuring sensor and the road surface that has been determined on the supposition that the vehicle is parallel to a flat road surface. Besides, if a result of the detection by the distance image sensor is utilized, it is possible to properly determine whether or not the vehicle is substantially parallel to the road surface. For example, in the case where the amount of change in the distance detected by each of the photosensitive cells contained in the distance image sensor is less than or equal to the pre-set threshold value, it can be determined that the vehicle is substantially parallel to the road surface.

The calibratability determination portion may determine that the vehicle is substantially parallel to the road surface when an amount of change in distance detected by each of photosensitive cells contained in the distance image sensor during a pre-set time is less than or equal to a pre-set threshold value.

With this construction, in the case where the amount of change in the distance detected by each one of the photosensitive cells contained in the distance image sensor during the pre-set time is "0", it means that the vehicle is moving parallel to the road surface. Therefore, in the case where the amount of change is less than or equal to a pre-set threshold value, it can be determined that the vehicle is substantially parallel to the road surface.

The calibratability determination portion may determine that the vehicle is substantially parallel to the road surface when, regarding a plurality of pre-set photosensitive cells among photosensitive cells contained in the distance image sensor, an amount of change in distance detected by each of the pre-set photosensitive cells during a pre-set time is less than or equal to a pre-set threshold value.

With this construction, since it suffices that it is determined whether or not the amount of change in the distance detected by each of the pre-set photosensitive cells during the pre-set time is less than or equal to the pre-set threshold value, the process that needs to be performed in order to determine whether or not the vehicle is substantially parallel to the road surface is simplified.

The calibratability determination portion may find a variance of brightnesses detected by photosensitive cells that are contained in the distance image sensor, and may determine whether or not the distance image sensor is in the calibratable state according to whether or not the variance is less than or equal to a pre-set threshold value.

With this construction, it can be properly determined whether or not the distance image sensor is in the calibratable state.

Specifically, the higher the brightness of reflected light of illumination, the higher the S/N ratio of the distance image sensor. Besides, in the case where a road surface has a water puddle or the like and therefore the reflectance of the road surface is low, the brightness detected by each of the photosensitive cells of the distance image sensor becomes low, and the S/N ratio of the distance image sensor also becomes low. Therefore, when the variance of the brightnesses of a road surface detected by the photosensitive cells contained in the distance image sensor is small, the road surface has a substantially uniform distribution of brightness, so that it can be determined that the distance image sensor is in the calibratable state.

Each of photosensitive cells contained in the distance image sensor may be set in a corresponding one of a plurality of pre-set divided regions. The calibratability determination portion, with regard to each of the divided regions, may find a variance of brightnesses detected by the photosensitive cells contained in a divided region, and may determine whether or not the divided region of the distance image sensor is in the calibratable state according to whether or not the variance is less than or equal to a pre-set threshold value. Furthermore, the calibration execution portion may calibrate the divided region of the distance image sensor that is determined as being in the calibratable state by the calibratability determination portion.

With this construction, among the plurality of divided regions, a divided region in which the road surface has a substantially uniform distribution of brightness is determined as being in the calibratable state. Therefore, it can be properly determined whether or not a divided region is in the calibratable state, with regard to each of the divided regions. Besides, even in the case where not all the photosensitive cells contained in the distance image sensor can be calibrated (i.e., the case where the distance image sensor as a whole is not in the calibratable state), the calibration of the distance image sensor can be performed with regard to each divided region, so that the distance image sensor can be efficiently calibrated.

The sensor calibration device may further include a correction coefficient storage portion that stores a correction coefficient for use for correcting a detected value from the distance image sensor, with regard to each of photosensitive cells contained in the distance image sensor. Furthermore, the calibration execution portion may calibrate the distance image sensor with regard to a plurality of brightnesses, and may record in the correction coefficient storage portion a correction coefficient found as a result of calibration so that the correction coefficient is associated in correspondence with information about the brightness in the correction coefficient storage.

With this construction, in the correction coefficient storage portion, the correction coefficients for correcting the detected values from the distance image sensor are stored with regard to each of the photosensitive cells contained in the distance image sensor. Furthermore, the calibration is performed for each of brightnesses, and the correction coefficients found as results of the calibration are recorded in the correction coefficient storage portion so that the correction coefficients correspond to the information about brightness. Therefore, proper calibration can be performed.

Specifically, since the calibration is performed for each of a plurality of brightnesses and the correction coefficients found as results of the calibration are stored in correspondence with the information about brightness in the correction coefficient storage portion, proper correction coefficients according to the brightness at the time of detection can be found from the correction coefficients that correspond to the brightnesses occurring at the time of the calibration. For example, in the case where two correction coefficients corresponding to two brightnesses occurring at the time of calibration are stored in the correction coefficient storage portion, the two correction coefficients can be linearly interpolated according to the brightness occurring at the time of detection, so that proper correction coefficients can be found.

The sensor calibration device may further include a state detection portion that detects state of the vehicle. The calibratability determination portion may determine whether or not the distance-measuring sensor is in the calibratable state based on a result of detection by the state detection portion.

With this construction, the state of the vehicle is detected, and it is determined whether or not the distance-measuring sensor is in the calibratable state on the basis of a result of the detection of the state of the vehicle. Therefore, it can be properly determined whether or not the distance-measuring sensor is in the calibratable state.

The state detection portion may include at least one of an acceleration sensor that detects acceleration of the vehicle, an inclination detection sensor that detects inclination of the vehicle, and a vehicle speed sensor that detects vehicle speed of the vehicle.

With this construction, the state of the vehicle is detected by at least one of an acceleration sensor that detects the acceleration of the vehicle, an inclination detection sensor that detects the inclination of the vehicle, and a vehicle speed sensor that detects the vehicle speed of the vehicle. Therefore, it can also be properly determined whether or not the distance-measuring sensor is in the calibratable state.

Specifically, in the case where the acceleration detected by the acceleration sensor is small, it can be estimated that the traveling state of the vehicle is stable, and therefore it can be determined that the distance-measuring sensor is in the calibratable state. In the case where the inclination of the vehicle detected by the inclination detection sensor is small, it can be estimated that the vehicle is substantially parallel to the road surface, and therefore it can be determined that the distance-measuring sensor is in the calibratable state. Furthermore, in the case where the vehicle speed detected by the vehicle speed sensor is small, it can be estimated that the change in the traveling state of the vehicle is small, and therefore it can be determined that the distance-measuring sensor is in the calibratable state.

The inclination detection sensor may detect at least one of yaw angle, pitch angle and roll angle of the vehicle.

With this construction, it can also be properly determined whether or not the distance-measuring sensor is in the calibratable state.

A second aspect of the invention is a sensor calibration method that calibrates a distance-measuring sensor that is mounted in a vehicle, and executes a calibratability determination step, and a calibration execution step. In the calibratability determination step, it is determined whether or not the distance-measuring sensor is in a calibratable state based on at least one of state of the vehicle and state of a road surface on which the vehicle is positioned. In the calibration execution step, the distance-measuring sensor is calibrated based on a pre-found distance between the distance-measuring sensor and the road surface on which the vehicle is positioned, when it is determined in the calibratability determination step that the distance-measuring sensor is in the calibratable state.

Since it is determined whether or not the distance-measuring sensor is in a calibratable state on the basis of at least one of the state of the vehicle and the state of the road surface on which the vehicle is positioned, it can be properly determined whether or not the distance-measuring sensor is in the calibratable state. Furthermore, since the distance-measuring sensor is calibrated on the basis of the pre-found distance between the distance-measuring sensor and the road surface on which the vehicle is positioned, the sensor can be easily calibrated.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a block diagram showing an example of a construction of a sensor calibration device in accordance with the invention;

FIG. 2A and FIG. 2B are illustrative diagrams showing examples of a detection region of a distance image sensor;

FIG. 4 is a side view illustrating an example of a reference distance that serves as a reference in the calibration;

FIG. 6 is a table showing examples of correction coefficients stored in a correction coefficient storage portion;

FIG. 9 is a detailed flowchart showing an example of a calibratability determination process that is executed in step S101 and step S111 in the flowchart shown in FIG. 8.

DETAILED DESCRIPTION OF EMBODIMENTS

Figure 3A:
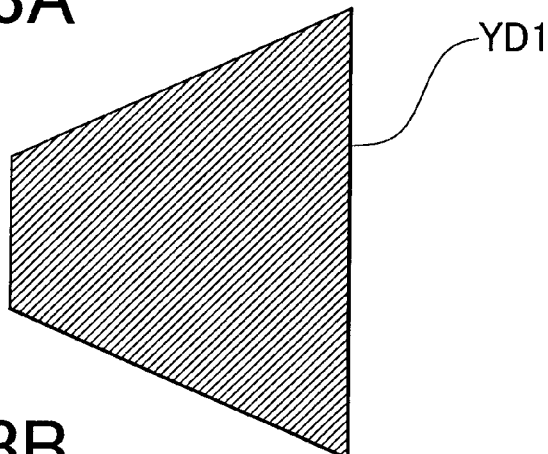
FIGS. 3A to 3C are illustrative diagrams showing examples of a distribution of brightnesses on a road surface SR which are detected by a CCD sensor of the distance image sensor.

A sensor calibration device in an embodiment of the invention is a device that calibrates a distance-measuring sensor that is mounted in a vehicle. FIG. 1 is a block diagram showing an example of a construction of such a sensor calibration device. As shown in FIG. 1, a sensor calibration ECU (Electronic Control Unit) 1 (that can be regarded as a portion of a sensor calibration device) is connected to a distance image sensor 2 and to an input appliance 3 so that the sensor calibration ECU 1 can communicate therewith.

The distance image sensor 2 (that can be regarded as a distance-measuring sensor) includes an LED (Light-Emitting Diode) 21 and a CCD (Charge Coupled Device) sensor 22. The LED 21 projects light in a pre-set direction (a rearward and obliquely downward direction, as can be seen in FIGS. 2A and 2B). The CCD sensor 22 receives reflected light that is projected from the LED 21 and then is reflected by a road surface, or by an object such as a vehicle or the like. The distance image sensor 2 finds the distance to a road surface, or to an object, such as a vehicle or the like, by the TOF method, on the basis of the period from a time point of light emission from the LED 21 to a time point of reception of reflected light by the CCD sensor 22.

FIG. 2A and FIG. 2B are illustrative diagrams showing an example of a detection region of the distance image sensor 2. FIG. 2A is a side view, and FIG. 2B is a plane view. As shown in FIGS. 2A and 2B, the distance image sensor 2 is mounted in a rear end portion of a vehicle VC, and is directed in a rearward and obliquely downward direction from the vehicle VC. Therefore, the detection region AR of the distance image sensor 2 is a quadrilateral pyramid-shape region that expands radially about an imaginary line that extends in a rearward and obliquely downward direction from the distance image sensor 2. The detection region AR herein refers to a region in which distance can be detected by the distance image sensor 2. Specifically, the distance to a road surface SR, or an object, such as a vehicle or the like, that exists within the detection region AR is detected by the distance image sensor 2. Besides, in the case where no object exists within the detection region AR as shown in FIGS. 2A and 2B, most of the photosensitive cells (hereinafter, referred to simply as "cells") that are provided within the CCD sensor 22 of the distance image sensor 2 detect reflected light from the road surface SR, so that the distance to the road surface SR is detected.

Although this embodiment will be described in conjunction with the case where the distance-measuring sensor is the distance image sensor 2, the invention is also applicable to a construction in which the distance-measuring sensor is a different kind of distance-measuring sensor. For example, the distance-measuring sensor may also be a radar sensor, an ultrasonic sensor, etc.

Referring back to FIG. 1, the input appliance 3 of the sensor calibration ECU 1 will be described. The input appliance 3 (which can be regarded as a portion of state detection means) includes an acceleration sensor 31, a yaw rate sensor 32, and a vehicle speed sensor 33. The acceleration sensor 31 is a three-axis acceleration sensor that detects the acceleration of the vehicle VC in the up-down, left-right, and front-rear directions, and outputs signals showing the accelerations detected in the up-down, left-right and front-rear directions to the sensor calibration ECU 1 (which, in this embodiment, is a state detection portion 11).

Although this embodiment will be described in conjunction with the case where the acceleration sensor 31 detects the accelerations of the vehicle VC in the up-down, left-right and front-rear directions of the vehicle VC, the invention is also applicable to a construction in which the acceleration sensor 31 detects the acceleration of the vehicle VC in at least one of the up-down, left-right and front-rear directions of the vehicle VC.

The yaw rate sensor 32 (that can be regarded as an inclination detection sensor) is made up of a rate integrating gyroscope or the like, and detects a yaw rate that indicates a rate of change in the yaw angle (rotational angular speed about a vertical axis that passes through the center of gravity of the vehicle). The yaw rate sensor 32 outputs a signal showing the yaw angle, to the sensor calibration ECU 1 (in this embodiment, the state detection portion 11). The vehicle speed sensor 33 detects the vehicle speed of the vehicle VC, and outputs a signal showing the vehicle speed to the sensor calibration ECU 1 (in this embodiment, the state detection portion 11).

Although the embodiment will be described in conjunction with the case where the input appliance 3 includes the acceleration sensor 31, the yaw rate sensor 32, and the vehicle speed sensor 33, the invention is also applicable to a construction in which the input appliance 3 includes at least one of the acceleration sensor 31, the yaw rate sensor 32, and the vehicle speed sensor 33.

Besides, although the embodiment will be described in conjunction the case where the input appliance 3 includes the yaw rate sensor 32, the invention is also applicable to a construction in which the input appliance 3 includes an inclination detection sensor that detects the inclination of the vehicle VC. That is, the input appliance 3 may include an inclination detection sensor that detects at least one of the pitch angle and the roll angle, instead of (or in addition to) the yaw rate sensor 32.

Besides, the sensor calibration ECU 1 includes the state detection portion 11, a calibratability determination portion 12, a calibration execution portion 13, and a correction coefficient storage portion 14, in terms of function. Incidentally, the sensor calibration ECU 1 causes a microcomputer that is disposed at an appropriate location in the sensor calibration ECU 1 to execute control programs pre-stored in a ROM (Read-Only Memory) that is disposed at an appropriate location in the sensor calibration ECU 1, or the like, so that the microcomputer functions as functional portions, such as the state detection portion 11, the calibratability determination portion 12, the calibration execution portion 13, etc., and so that a RAM (Random Access Memory) or the like disposed at an appropriate location in the sensor calibration ECU 1 functions as the correction coefficient storage portion 14.

The correction coefficient storage portion 14 (which can be regarded as a correction coefficient storage means) is a functional portion that stores correction coefficients that are used to correct detected values from the distance image sensor 2, with regard to each of the cells provided in the CCD sensor 22 of the distance image sensor 2, in such a manner that the correction coefficients are associated in correspondence with the brightness information in the correction coefficient storage portion 14. Incidentally, the brightness information and the correction coefficient information stored in the correction coefficient storage portion 14 are written in by the calibration execution portion 13, and are read therefrom when the distance image sensor 2 executes the detection of a distance image. An example of the information stored in the correction coefficient storage portion 14 will be described later with reference to FIG. 6.

The state detection portion 11 (which can be regarded as state detection means) is a functional portion that detects the state of the vehicle VC via the input appliance 3. Concretely, the state detection portion 11 detects the accelerations $\alpha 1$ to $\alpha 3$ in the up-down direction, the left-right direction and the front-rear direction of the vehicle VC via the acceleration sensor 31, and detects the yaw angle $\theta$ via the yaw rate sensor 32 of the vehicle VC, and detects the vehicle speed V of the vehicle VC via the vehicle speed sensor 33, at every pre-set time (e.g., 10 msec).

The calibratability determination portion 12 (which can be regarded as calibratability determination means) is a functional portion that determines whether or not the distance image sensor 2 is in a calibratable state on the basis of the state of the vehicle VC and the state of the road surface SR on which the vehicle VC is located.

Concretely, the calibratability determination portion 12 determines whether or not the distance image sensor 2 is in the calibratable state according to whether or not the vehicle VC is substantially parallel to the road surface SR. Besides, the calibratability determination portion 12 determines whether or not the distance image sensor 2 is in the calibratable state, on the basis of the state of the road surface SR. Furthermore, the calibratability determination portion 12 determines whether or not the distance image sensor 2 is in the calibratable state, on the basis of the state of the vehicle VC detected by the state detection portion 11.

The method of determining whether or not the vehicle VC is substantially parallel to the road surface SR which is performed by the calibratability determination portion 12 will be described below. The calibratability determination portion 12 determines whether or not the vehicle VC is substantially parallel to the road surface SR on the basis of a result of the detection by the distance image sensor 2. If the vehicle VC is determined as being substantially parallel to the road surface SR, the calibratability determination portion 12 determines that the vehicle VC is in the calibratable state. Concretely, the calibratability determination portion 12 determines that the vehicle VC is substantially parallel to the road surface SR if the amount of change $\Delta L$ in the detected distance during a pre-set time $\Delta T$ (e.g., 1 second) is less than or equal to a pre-set threshold value $\Delta Lsh$ (e.g., 10 mm), with regard to a plurality of pre-set cells among the cells that are provided in the distance image sensor 2.

In this example, the photosensitive cells provided in the distance image sensor 2 are divided into a plurality of divided regions (e.g., nine divided regions in a grid arrangement), and the cells each of which is positioned substantially at the center of a corresponding one of the divided regions are set as the cells that are used to determine whether or not the vehicle VC is substantially parallel to the road surface SR.

Thus, on the basis of a result of the detection by the distance image sensor 2, it is determined whether or not the vehicle VC is substantially parallel to the road surface SR. According to a result of the determination, it is determined whether or not the distance image sensor 2 is in the calibratable state. Incidentally, although the embodiment will be described in conjunction with the case where the calibratability determination portion 12 determines whether or not the vehicle VC is substantially parallel to the road surface SR on the basis of a result of the detection by the distance image sensor 2, the invention is also applicable to a construction in which the calibratability determination portion 12 determines whether or not the vehicle VC is substantially parallel to the road surface SR on the basis of the detection result provided by a sensor other than the distance image sensor 2 (e.g., the yaw rate sensor 32 or the like), instead of (or in addition to) the detection result provided by the distance image sensor 2.

Besides, it is determined whether or not the vehicle VC is substantially parallel to the road surface SR on the basis of the detection result provided by the distance image sensor 2, and according to the result of the determination, it is determined whether or not the distance image sensor 2 is in the calibratable state, as described above. Therefore, the distance image sensor 2 can be appropriately calibrated.

That is, in the case where the vehicle VC is substantially parallel to the road surface SR, the distance image sensor 2 can be properly calibrated by using the distance that is found beforehand on the supposition that the vehicle VC is parallel to a flat road surface SR0 (distances L1 to L3 between the distance image sensor 2 and the road surface SR0 (see FIG. 4)).

Furthermore, it is determined that the vehicle VC is substantially parallel to the road surface SR if the amount of change $\Delta L$ in the detected distance during the pre-set time $\Delta T$ is less than or equal to the pre-set threshold value $\Delta Lsh$, with regard to each of the cells contained in the CCD sensor 22 of the distance image sensor 2. Therefore, it can be properly determined that the vehicle VC is substantially parallel to the road surface SR.

That is, when the amount of change $\Delta L$ during the pre-set time $\Delta T$ in the distance detected by each of the cells provided in the CCD sensor 22 of the distance image sensor 2 is "0", the vehicle VC is moving parallel to the road surface SR during that period of time. Therefore, when the amount of change $\Delta L$ is less than or equal to the pre-set threshold value $\Delta Lsh$, it can be determined that the vehicle VC is substantially parallel to the road surface SR.

In addition, since it is determined that the vehicle VC is substantially parallel to the road surface SR in the case where the amount of change $\Delta L$ in the detected distance during the pre-set time $\Delta T$ is less than or equal to the pre-set threshold value $\Delta Lsh$, with regard to a plurality of pre-set cells among the cells provided in the CCD sensor 22 of the distance image sensor 2, it is possible to easily determine that the vehicle VC is substantially parallel to the road surface SR.

That is, since it suffices to determine whether or not the amount of change $\Delta L$ in the detected distance during the pre-set time $\Delta T$ is less than or equal to the pre-set threshold value $\Delta Lsh$ with regard to a plurality of pre-set cells among the cells that are provided in the CCD sensor 22 of the distance image sensor 2, the process needed for the determination is simplified.

Next, a method of determining whether or not the distance image sensor 2 is in the calibratable state on the basis of the state of the road surface SR which is performed by the calibratability determination portion 12 will be described. The calibratability determination portion 12 finds a variance $\sigma$ of the brightnesses detected by the cells contained in the CCD sensor 22 of the distance image sensor 2, and determines whether or not the distance image sensor 2 is in the calibratable state according to whether or not the variance $\sigma$ is less than or equal to a pre-set threshold value $\sigma sh$.

Concretely, each of the cells contained in the CCD sensor 22 of the distance image sensor 2 is set in a corresponding one of the pre-set divided regions (nine regions in this embodiment). Then, the calibratability determination portion 12 finds a variance $\sigma$ of the brightnesses detected by the cells contained in each of the divided regions, and determines whether or not the divided region of the distance image sensor 2 is in the calibratable state according to whether or not the variance $\sigma$ in the divided region is less than or equal to the pre-set threshold value $\sigma sh$, with regard to each of the divided regions.

Figure 3B:
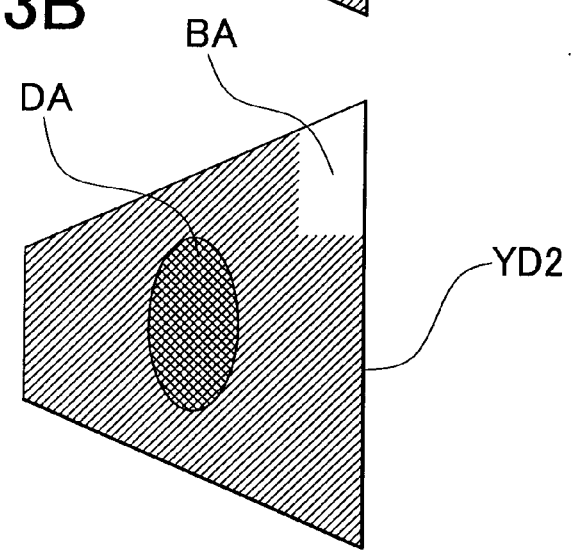
Figure 3C:
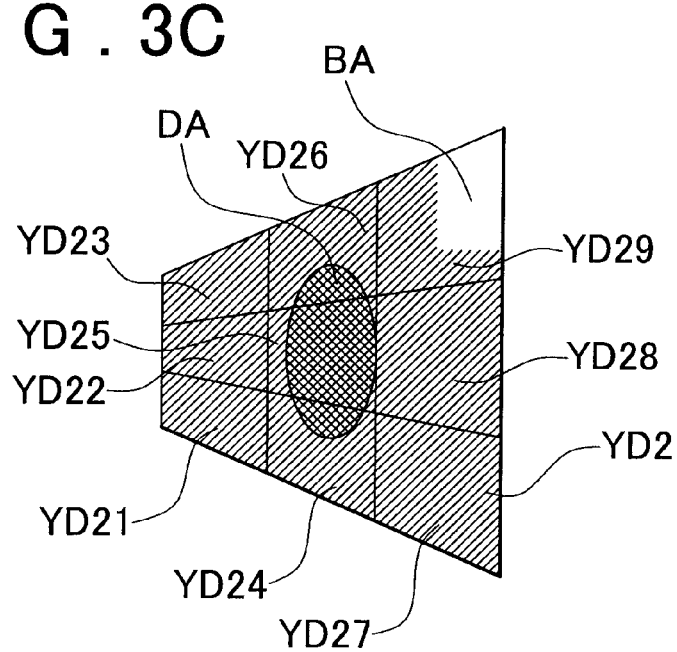

FIGS. 3A to 3C are illustrative diagrams showing examples of the distribution of brightness on a road surface SR that are detected by the CCD sensor 22 of the distance image sensor 2. The road surface SR detected by the CCD sensor 22 of the distance image sensor 2 has a trapezoidal shape as shown in FIGS. 3A to 3C. FIG. 3A is a brightness distribution diagram YD1 regarding the road surface SR in the case where the brightness is uniform over the surface. In the case where the brightness is uniform, it is determined by the calibratability determination portion 12 that the distance image sensor 2 is in the calibratable state.

FIG. 3B is a brightness distribution diagram YD2 regarding the road surface SR in the case where the brightness is non-uniform over the surface. In the brightness distribution diagram YD2, there are a region BA with direct sun shine, and a region DA that has a water puddle, and therefore has a reflectance that is lower than that of the road surface SR. In this region BA, since the backlight is strong, the shot noise increases, so that the S/N ratio, which is a factor of distance error of the distance image sensor 2, declines and therefore proper measurement of distance cannot be performed. In the region DA with low brightness, since the reflectance is low, reflected light of the light emitted from the LED 21 is scarcely input to the CCD sensor 22; so that the S/N ratio of the distance image sensor 2 declines and therefore proper distance measurement cannot be performed.

FIG. 3C is a brightness distribution diagram YD2 of the road surface SR in the case where the state of the road surface is the same as the state shown in FIG. 3B, and where the CCD sensor 22 is divided into nine divided regions. As shown in FIG. 3C, the brightness distribution diagram YD2 is divided into nine divided regions YD21 to YD29. Then, since the divided regions YD24 to YD26 contain the low-brightness region DA, the calibratability determination portion 12 determines that the divided regions YD24 to YD26 are not in the calibratable state. Besides, since the divided region YD29 contains the region BA that has strong backlight, the calibratability determination portion 12 determines that the divided region YD29 is not in the calibratable state. On the other hand, since the divided regions YD21 to YD23, YD27 and YD28 are regions of the road surface that are in an environment with relatively weak background light and that have a certain reflectance or higher (do not have a water puddle or the like), the calibratability determination portion 12 determines that the divided regions YD21 to YD23, YD27 and YD28 are in the calibratable state.

Thus, of the plurality of (nine in this embodiment) divided regions YD21 to YD29, the divided regions (in this embodiment, the divided regions YD21 to YD23, YD27 and YD28) in which the road surface SR has a substantially uniform brightness distribution (i.e., in which the variance $\sigma$ of the brightness is less than or equal to the pre-set threshold value $\sigma sh$) are determined as being in the calibratable state by the calibratability determination portion 12. Therefore, it can be properly determined whether or not a divided region is in the calibratable state with regard to each of the divided regions YD21 to YD29, so that the calibration accuracy can be improved. Besides, even in the case where the calibration cannot be carried out for all the cells contained in the CCD sensor 22 of the distance image sensor 2 (i.e., the case where the distance image sensor 2 as a whole is not in the calibratable state), the calibration can be performed separately for each of the divided regions YD21 to YD29 of the CCD sensor 22 of the distance image sensor, so that it is possible to efficiently calibrate the distance image sensor 2.

Although this embodiment will be described in conjunction with the case where each of the cells contained in the CCD sensor 22 of the distance image sensor 2 is set in a corresponding one of the nine divisions region YD21 to YD29 as shown in FIG. 3C, it suffices that each of the cells contained in the CCD sensor 22 of the distance image sensor 2 is set in a corresponding one of a plurality of divided regions. That is, the number of divided regions may also be a number other than nine. The greater the number of divided region, the higher the possibility of performance of the calibration of a divided region can be made. Conversely, the smaller the number of divided regions, the simpler the process can be made, and the more the accuracy of the calibration can be improved. Besides, in this embodiment, it is possible to determine that the distance calibration be started if, as a calibration start condition for the distance image sensor 2, the brightness information regarding the picture-taking area (a road surface, a wall, etc.) indicates that the brightness (S/N ratio) is higher than or equal to a certain brightness and the variance of the entire brightness distribution (histogram) is within a certain range.

Referring back to FIG. 1 again, a functional construction of the sensor calibration ECU 1 will be described. The calibratability determination portion 12 is also a functional portion that determines whether or not the distance image sensor 2 is in the calibratable state on the basis of a result of the detection by the state detection portion 11. Concretely, the calibratability determination portion 12 determines whether or not the distance image sensor 2 is in the calibratable state on the basis of the accelerations $\alpha 1$ to $\alpha 3$ detected via the acceleration sensor 31, the yaw angle $\theta$ detected by the yaw rate sensor 32, and the vehicle speed V detected via the vehicle speed sensor 33.

That is, the calibratability determination portion 12 determines that the distance image sensor 2 is in the calibratable state if the following three conditions (conditions A to C) are satisfied. Condition A: the accelerations $\alpha 1$ to $\alpha 3$ are each less than or equal to their respective pre-set threshold values. Condition B: the yaw angle $\theta$ is less than or equal to a pres-set threshold value. Condition C: the vehicle speed V is less than or equal to a pres-set threshold value.

The state of the vehicle VC is detected as described above, and then it is determined, on the basis of a result of the detection, whether or not the distance image sensor 2 is in the calibratable state. Therefore, it can be properly determined whether or not the distance image sensor 2 is in the calibratable state.

In the case where the accelerations $\alpha 1$ to $\alpha 3$ detected by the acceleration sensor 31 are small, it can be estimated that the traveling state of the vehicle VC is stable, so that it can be determined that the distance image sensor 2 is in the calibratable state. In the case where the yaw angle $\theta$ detected by the yaw rate sensor 32 is large, it can be estimated that the vehicle VC is not substantially parallel to the road surface, so that it can be determined that the distance image sensor 2 is not in the calibratable state. In addition, in the case where the vehicle speed V detected by the vehicle speed sensor 33 is small, it can be estimated that the change in the traveling state of the vehicle VC is small, so that it can be determined that the distance image sensor 2 is in the calibratable state.

This embodiment is described in conjunction with the case where the calibratability determination portion 12 determines whether or not the distance image sensor 2 is in the calibratable state on the basis of the accelerations $\alpha 1$ to $\alpha 3$, the yaw angle $\theta$, and the vehicle speed V. However, the invention is also applicable to a construction in which the calibratability determination portion 12 determines whether or not the distance image sensor 2 is in the calibratable state on the basis of a detection value that indicates a state of the vehicle VC instead of (or in addition to) the accelerations $\alpha 1$ to $\alpha 3$, the yaw angle $\theta$ and the vehicle speed V. For example, the calibratability determination portion 12 may also determine whether or not the distance image sensor 2 is in the calibratable state on the basis of the pitch angle and the roll angle of the vehicle, instead of (or in addition to) the yaw angle $\theta$.

Referring back to FIG. 1 again, a functional construction of the sensor calibration ECU 1 will be described. In the case where the calibratability determination portion 12 has determined that the distance image sensor 2 is in the calibratable state, the calibration execution portion 13 (that corresponds to calibration execution means) calibrates the distance image sensor 2 on the basis of a pre-found distance between the distance image sensor 2 and the road surface SR on which the vehicle VC is positioned (hereinafter, referred to as "reference distance").

FIG. 4 is a side view illustrating an example of the reference distance that is a distance that serves as a reference for the calibration. The reference distance is set, for example, as shown in FIG. 4 in the case where the road surface SR is a flat surface parallel to the vehicle VC (not shown) (the road surface SR in this case will hereinafter be referred to as "reference road surface SR0"). That is, the reference distance is set as an optical path length (e.g., optical path lengths L1, L2, L3, etc.) along which the light ray emitted from the LED 21 of the distance image sensor 2 is reflected by the reference road surface SR0, and then reaches the CCD sensor 22. In addition, optical path lengths L1, L2, L3, etc., with respect to the distance L0 between the LED 21 and a calibration reference point of the CCD sensor 22 are known values.

That is, the reference distance (=optical path length L1, L2, L3, etc.) can be calculated beforehand according to a geometric relation of the distance image sensor 2 (the LED 21 and the CCD sensor 22) with the reference road surface SR0 which is determined on the basis of the position of the distance image sensor 2 in the vehicle VC. Therefore, the distance image sensor 2 can easily be calibrated on the basis of the pre-calculated reference distance.

Figure 5A:
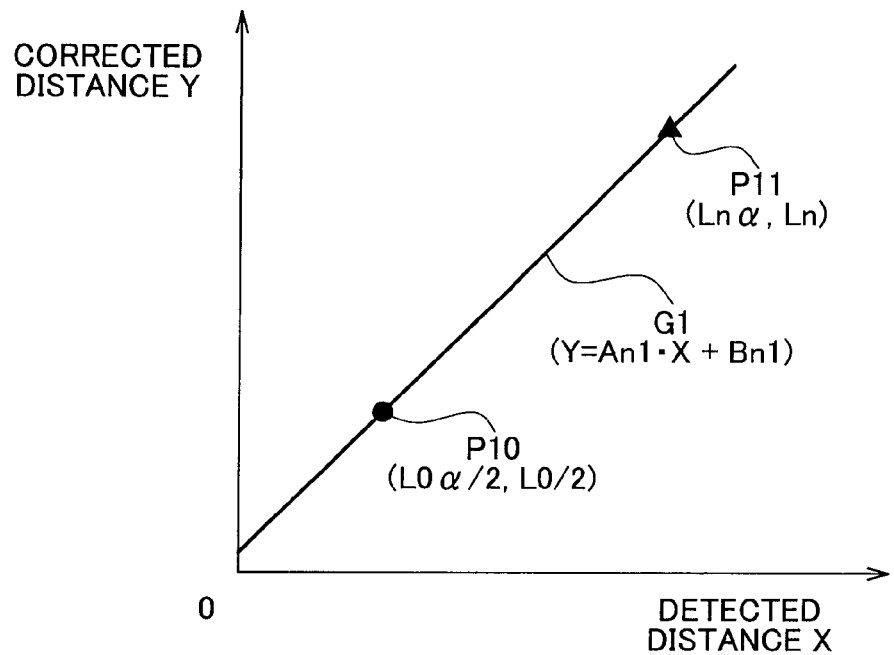
FIG. 5A and FIG. 5B are graphs showing examples of a calculation method for correction coefficients which is performed by a calibration execution portion.
Figure 5B:
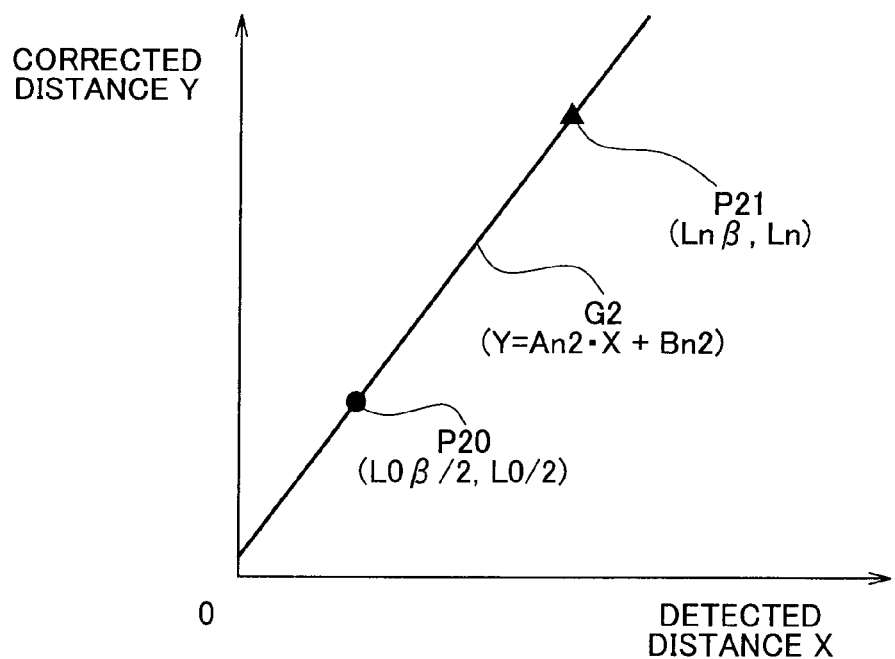

Besides, the calibration execution portion 13 performs the calibration for each of a plurality of brightnesses $\gamma n1$ and $\gamma n2$ (two brightnesses in this embodiment), and records correction coefficients found as results of the calibration (that are a slope An1, a y-axis intercept Bn1, a slope An2, and a y-axis intercept Bn2, as shown in FIGS. 5A and 5B, and FIG. 6, in this embodiment) in the correction coefficient storage portion 14 in such a manner that the correction coefficients are associated in correspondence with the brightnesses $\gamma n1$ and $\gamma n2$. It is to be noted herein that the cell ID No. n is a number for distinguishing the photosensitive cells that constitute the CCD sensor 22, and is one of 1 to M (where M is the number of the cells of the CCD sensor 22). Incidentally, the brightness $\gamma n2$ is greater than the brightness $\gamma n1$.

FIGS. 5A and 5B are graphs showing examples of the correction coefficient-calculating methods performed by the calibration execution portion 13. In the graphs, the horizontal axis represents a detected distance X, and the vertical axis represents a corrected distance Y. Incidentally, the correction distance Y is a distance that is to be detected (=true value of the distance), and is the reference distance (=optical path length L1, L2, L3, etc.) mentioned above with reference to FIG. 4. FIG. 5A shows a graph G1 showing an example of the method of calculating the correction coefficients (the slope An1, and the intercept Bn1 in this embodiment) at the brightness γn1, and FIG. 5B shows a graph G2 showing an example of the method of calculating the correction coefficients (the slope An2, and the intercept Bn2 in this embodiment) at the brightness γn2.

A measurement point P10 in FIG. 5A is a measurement point in the case where light projected from the LED 21 enters a cell of cell ID No. n in the CCD sensor 22 directly (i.e., without being reflected by the road surface SR or the like). Another measurement point P11 is a measurement point in the case where light projected from the LED 21 is reflected by the road surface SR, and the reflected light therefrom enters the cell of cell ID No. n in the CCD sensor 22. The graph G1 is a straight line passing through the measurement point P10 and the measurement point P11, and is expressed by the following equation (1).

$$Y = An1 \times X + Bn1 \quad (1)$$

That is, the calibration execution portion 13 acquires a detected distance (L0α/2) and a detected distance (Lnα) that correspond to the two different measurement points, that is, the measurement point P10 and the measurement point P11, respectively, via the distance image sensor 2, and compares the detected distances with the reference distances (i.e., corrected distances) (L0/2) and (Ln) that correspond to the measurement point P10 and the measurement point P11, respectively, so as to find correction coefficients (the slope An1, and the intercept Bn1 in this embodiment).

Similarly, a measurement point P20 in FIG. 5B is a measurement point in the case where light projected from the LED 21 enters cell of cell ID No. n in the CCD sensor 22 directly (i.e., without being reflected by the road surface SR or the like). Another measurement point P21 is a measurement point in the case where light projected from the LED 21 is reflected by the road surface SR, and the reflected light therefrom enters the cell of cell ID No. n in the CCD sensor 22. The graph G2 is a straight line passing through the measurement point P20 and the measurement point P21, and is expressed by the following equation (2).

$$Y = An2 \times X + Bn2 \quad (2)$$

That is, the calibration execution portion 13 acquires a detected distance (L0β/2) and a detected distance (Lnβ that correspond to the two different measurement points, that is, the measurement point P20 and the measurement point P21, respectively, via the distance image sensor 2, and compares the detected distances with the reference distances (i.e., corrected distances) (L0/2) and (Ln) that correspond to the measurement point P20 and the measurement point P21, respectively, so as to find correction coefficients (the slope An2, and the intercept Bn2 in this embodiment).

FIG. 6 is a table showing examples of the correction coefficients stored in the correction coefficient storage portion 14. In the table, the extreme left column shows the cell ID Nos. n. For each cell ID No. n, the slope A and the intercept B associated in correspondence with the brightness γ are stored as low-brightness-side correction coefficients, and, similarly, the slope A and the intercept B associated in correspondence with the brightness γ are stored as high-brightness-side correction coefficients.

Figure 7A:
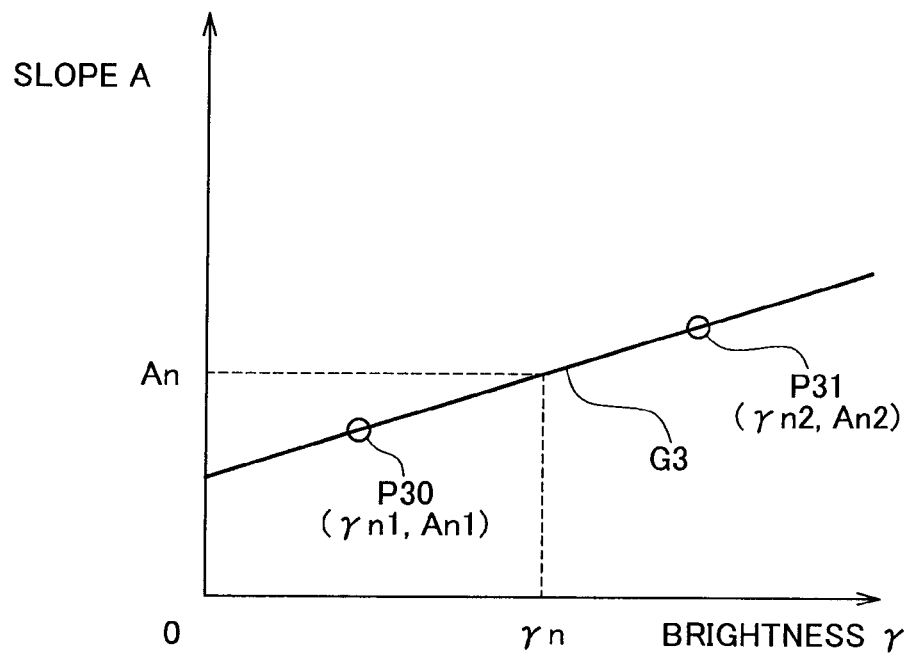
FIG. 7A and FIG. 7B are graphs showing examples of a method of correcting a detection value from the distance image sensor by using correction coefficients stored in the correction coefficient storage portion.
Figure 7B:
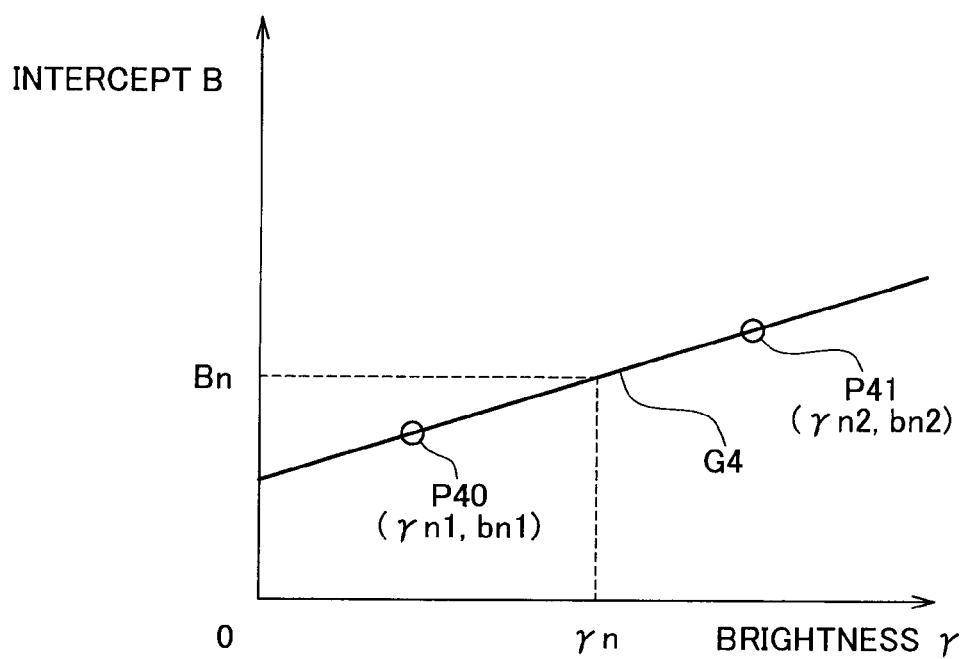

FIGS. 7A and 7B show graphs showing examples of methods of correcting a detected value from the distance image sensor 2 by using correction coefficients stored in the correction coefficient storage portion 14. FIG. 7A shows a graph G3 showing an example of the method of finding the slope An for use in the correction, and FIG. 7B shows a graph G3 showing an example of the method of finding the intercept Bn for use in the correction. It is to be noted herein that the cell ID No. n is a number for identifying the photosensitive cells that constitute the CCD sensor 22, and is one of 1 to M (M is the number of the cells of the CCD sensor 22). In FIG. 7A, the horizontal axis represents the brightness γ, and the vertical axis represents the slope A. In FIG. 7B, the horizontal axis represents the brightness γ, and the vertical axis represents the intercept B.

In FIG. 7A, the correction point P30 is a point that corresponds to a low-brightness-side correction coefficient, and the correction point P31 is a point that corresponds to a high-brightness-side correction coefficient. The graph G3 is a straight line passing through the correction point P30 and the correction point P31. In the case where the brightness detected by cells that correspond to cell ID Nos. n is a brightness γn, a correction coefficient (=slope An) for use in the correction is found through the use of the graph G3 as shown in FIG. 7A.

In FIG. 7B, a correction point P40 is a point that corresponds to a low-brightness-side correction coefficient, and a correction point P41 is a point that corresponds to a high-brightness-side correction coefficient. The graph G4 is a straight line passing through the correction point P40 and the correction point P41. In the case where the brightness detected by cells that correspond to cell ID Nos. n is a brightness γn, a correction coefficient (=intercept Bn) for use in the correction is found through the use of the graph G4 as shown in FIG. 7B.

Then, using the slope An found through the use of the graph shown in FIG. 7A as described above, and the intercept Bn found through the use of the graph shown in FIG. 7B as described above, a corrected distance Y is found from the detected distance X through the following equation (3).

$$Y = An \times X + Bn \quad (3)$$

Thus, the calibration is performed for each of a plurality of brightnesses γn1 and γn2 (two brightnesses in this embodiment), and correction coefficients found as results of the calibration (that are the slope An1, the y-axis intercept Bn1, the slope An2, and the y-axis intercept Bn2 in this embodiment) are recorded in the correction coefficient storage portion 14 in such a manner that the correction coefficients are associated in correspondence with the brightnesses γn1 and γn2. Therefore, since proper correction coefficients (the slope An, and the intercept Bn) can be found according to the brightness γn at the time of detection, through the use of a plurality of correction coefficients (two correction coefficients in this embodiment) that correspond to a plurality of brightnesses (two brightnesses in this embodiment) at the time of calibration, it is possible to perform a proper calibration. For example, in the case where two correction coefficients (the slope An1, the intercept Bn1, the slope An2, and the intercept Bn2 in this embodiment) that correspond to each of the two brightnesses γn1 and γn2 at the time of calibration stored in the correction coefficient storage portion 14, proper correction coefficients (the slope An and the intercept Bn in this embodiment) can be found through linear interpolation of the two correction coefficients according to the brightnesses γn at the time of detection. As described above, in this embodiment, the results of the distance correction for each of the brightnesses can be obtained with respect to the detected objects (each pixel). Then, by further implementing the linear interpolation on the basis of the detected brightness information, it becomes possible to perform a distance calibration process that takes into account the brightness as well.

Although the embodiment has been described in conjunction with the case where the calibration execution portion 13 calibrates the distance image sensor 2 by linear interpolation for each of the two brightnesses γn1 and γn2, the invention is also applicable to a construction in which the calibration execution portion 13 performs the calibration by curve interpolation for each of the three or more brightnesses. In such a case, more proper correction coefficients can be found. Besides, it is also permissible to adopt a construction in which the calibration execution portion 13 performs the calibration by difference interpolation at one brightness.

Figure 8:
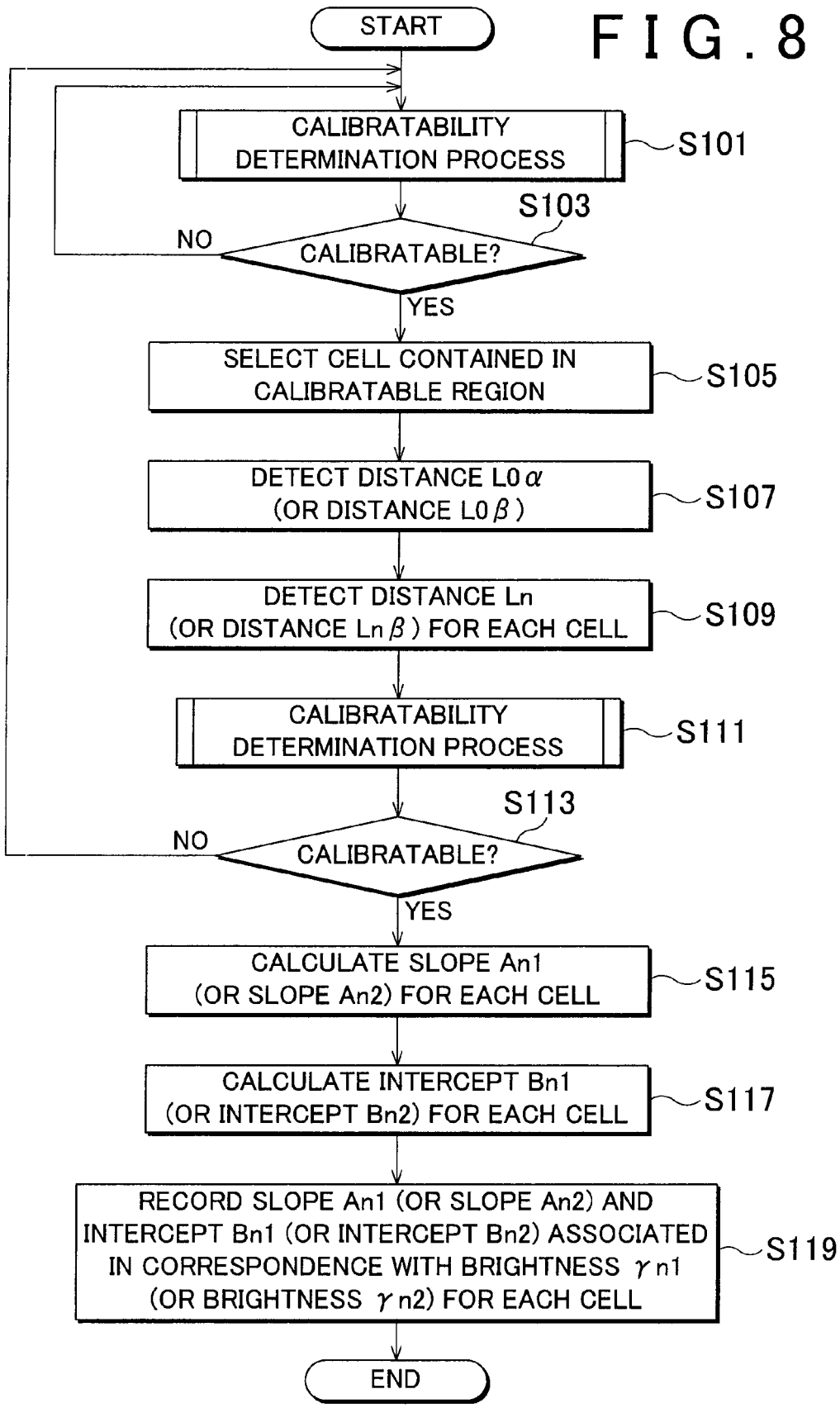
FIG. 8 is a flowchart showing an example of an operation of a sensor calibration ECU.

FIG. 8 is a flowchart showing an example of the operation of the sensor calibration ECU 1. Firstly, the calibratability determination portion 12 executes a calibratability determination process that is a process of determining whether or not the distance image sensor 2 is in the calibratable state (S101). Then, the calibration execution portion 13 determines whether or not there exists a region in which the calibration is feasible. If it is determined that there is no region in which the calibration is feasible (NO in S103), the process returns to step S101 to repeat the process starting in step S101. If it is determined that there is a region in which the calibration is feasible (YES in S103), the calibration execution portion 13 selects a photosensitive cell that is contained in the calibration-feasible region (S105).

Then, for each of the cells selected in step S105, a detected distance L0α (or L0β) in the case where light projected from the LED 21 enters a cell of cell ID No. n in the CCD sensor 22 directly (i.e., without being reflected by the road surface SR or the like) is detected (S107). Next, for each of the cells selected in step S105, a detected distance Lnα (or Lnβ) in the case where light projected from the LED 21 is reflected by the road surface SR, and the reflected light therefrom enters the cell of cell ID No. n in the CCD sensor 22 is detected (S109). Subsequently, the calibratability determination portion 12 executes the calibratability determination process again with respect to the region that is determined as being a calibration-feasible region in step S101 (S111).

Then, the calibration execution portion 13 determines whether or not there is a region in which the calibration is feasible (S113). If it is determined that there is no calibration-feasible region (NO in S113), the process returns to step S101 to repeat the process starting in step S101. If it is determined that there is a calibration-feasible region (YES in S113), correction coefficients (the slope An1 and the intercept Bn1, or the slope An2 and the intercept Bn2) are found (S115 and S117) by comparing the detected distance L0α (or L0β) detected in step S107 and the detected distance Lnα (or Lnβ) detected in step S109 with the reference distances (=corrected distances) (L0/2) and (Ln). Next, by the calibration execution portion 13, the correction coefficients (the slope An1 and the intercept Bn1, or the slope An2 and the intercept Bn2) found in steps S115 and S117 are recorded in the correction coefficient storage portion 14 (S119) in such a manner that the correction coefficients are associated in correspondence with the brightness γn1 (the brightness γn2).

Incidentally, step S101 and step S111 in the flowchart shown in FIG. 8 can be regarded as a calibratability determination step in the sensor calibration method in accordance with the invention, and steps S103 to 109 and steps S113 to S119 in the flowchart shown in FIG. 8 can be regarded as a calibration execution step in the sensor calibration method in accordance with the invention.

FIG. 9 is a detailed flowchart showing an example of the calibratability determination process that is executed in step S101 and step S111 in the flowchart shown in FIG. 8. For the sake of convenience, the following description will be made in conjunction with the case where the accelerations α1 to α3, the yaw angle θ and the vehicle speed V have been detected beforehand by the state detection portion 11. Incidentally, the following process is all performed by the calibratability determination portion 12. Firstly, it is determined whether or not all the accelerations α1 to α3 are less than or equal to a pre-set threshold value (S201). If it is determined that any one of the accelerations α1 to α3 is larger than the threshold value (NO in S201), the process proceeds to step S207.

If all the accelerations α1 to α3 are less than or equal to the threshold value (YES in S201), it is then determined whether or not the yaw angle θ is less than or equal to a pre-set threshold value (S203). If it is determined that the yaw angle θ is larger than the threshold value (NO in S203), the process proceeds to step S207. If it is determined that the yaw angle θ is less than or equal to the threshold value (YES in S203), it is then determined whether or not the vehicle speed V is less than or equal to a pre-set threshold value (S205). If it is determined that the vehicle speed V is larger than the threshold value (NO in S205), the process proceeds to step S207.

If NO is the answer to the determination in step S201, or if NO in step S203, or if NO in step S205, or if NO in step S211, it is then determined that the distance image sensor 2 is not in the calibratable state (S207), and the process returns to step S103 (or step S113) shown in FIG. 8.

If it is determined that the vehicle speed V is less than or equal to the threshold value (YES in S205), an amount of change ΔL in the detected distance is calculated for each of the cells each of which is positioned substantially at the center of a corresponding one of the nine divided regions (see FIG. 3C) (S209). Then, with regard to each of the substantially center cells of the nine divided regions (see FIG. 3C), it is determined whether or not the amount of change ΔL in the detected distance calculated in step S209 is less than or equal to a threshold value ΔLsh (S211). If it is determined that at least one of the amounts of change ΔL that correspond one-to-one to the divided regions is larger than the threshold value ΔLsh (NO in S211), the process proceeds to step S207. If all the amounts of change ΔL corresponding one-to-one to the divided regions (nine divided regions in this embodiment) are less than or equal to the threshold value ΔLsh (YES in S211), the brightness γn is detected via each of the corresponding cells in the CCD sensor 22 (S213). Then, for each of the nine divided regions (see FIG. 3), the variance σ of the brightness γn detected by the cells contained in the divided region is calculated (S215). Next, for each of the divided regions, it is determined whether or not the variance σ is less than or equal to a pre-set threshold value σsh (S217).

If it is determined that the variance σ of a divided region is less than or equal to the threshold value σsh (YES in S217), it is then determined that the divided region is in the calibratable state (S219), and the process returns to step S103 (or step S113) shown in FIG. 8. If it is determined that the variance σ of a divided region is larger than the threshold value σsh (NO in S217), it is then determined that the divided region is not in the calibratable state (S221), and the process returns to step S103 (or step S113) shown in FIG. 8.

Since it is determined whether or not the distance image sensor 2 is in the calibratable state on the basis of the state of the vehicle VC and the state of the road surface SR on which the vehicle VC is positioned as described above, it can be properly determined whether or not the distance image sensor 2 is in the calibratable state. Furthermore, since the distance image sensor 2 is calibrated on the pre-found distance (=reference distance) between the distance image sensor 2 and the road surface SR on which the vehicle VC is positioned, it is possible to easily calibrate the distance image sensor 2.

Although the embodiment has been described in conjunction with the case where the calibratability determination portion 12 determines whether or not the distance image sensor 2 is in the calibratable state on the basis of the state of the vehicle VC and the state of the road surface SR on which the vehicle VC is positioned, it suffices that a construction is provided in which the calibratability determination portion 12 determines whether or not the distance image sensor 2 is in the calibratable state on the basis of at least one of the state of the vehicle VC and the state of the road surface SR on which the vehicle VC is positioned.

Incidentally, the sensor calibration device in accordance with the invention is not limited to the foregoing embodiments, but may also be constructed as follows. (A) Although the embodiment has been described in conjunction with the case where the sensor calibration ECU 1 functionally includes the state detection portion 11, the calibratability determination portion 12, the calibration execution portion 13, etc., it is also permissible to adopt a construction in which at least one of these functional portions, that is, the state detection portion 11, the calibratability determination portion 12, and the calibration execution portion 13, is constructed by a hardware device such as an electric circuit or the like.

(B) Although the embodiment has been described in conjunction with the case where the calibratability determination portion 12 performs the calibratability determination process before and after acquiring data for use in the calibration (i.e., performs the process in step S101 and step S111) as shown in the flowchart of FIG. 8, it is also permissible to adopt a construction in which the calibratability determination portion 12 performs the calibratability determination process at least one of before and after acquiring data for use in the calibration. In this case, the process is simplified.

This invention is applicable to, for example, a sensor calibration device that calibrates a distance-measuring sensor that is mounted in a vehicle, and to a sensor calibration method for such a distance-measuring sensor. In particular, the invention is applicable to a sensor calibration device that calibrates a distance image sensor that is mounted in a vehicle, and to a sensor calibration method for such a distance image sensor.

What is claimed is:

1. A sensor calibration device that calibrates a distance-measuring sensor that is mounted in a vehicle, comprising:
a calibratability determination portion that determines whether or not the distance-measuring sensor is in a calibratable state based on at least one of state of the vehicle and state of a road surface on which the vehicle is positioned; and
a calibration execution portion that determines a correction coefficient to calibrate the distance-measuring sensor when the distance-measuring sensor is determined to be in the calibratable state, the correction coefficients being determined based on a pre-found distance between the distance-measuring sensor and the road surface on which the vehicle is positioned, the calibration execution portion mathematically applying the correction coefficient to a detected value detected by the distance-measuring sensor to generate a corrected value,
wherein the distance-measuring sensor is a distance image sensor at least a portion of whose detection region is the road surface, and the calibratability determination portion determines whether or not the distance image sensor is in the calibratable state based on a result of detection by the distance image sensor,
the calibratability determination portion determines whether or not the vehicle is substantially parallel to the road surface based on the result of detection by the distance image sensor, and then determines that the distance image sensor is in the calibratable state when the vehicle is substantially parallel to the road surface, and
the calibratability determination portion determines that the vehicle is substantially parallel to the road surface when, regarding a plurality of pre-set photosensitive cells among photosensitive cells contained in the distance image sensor, an amount of change in distance detected by each of the pre-set photosensitive cells during a pre-set time is less than or equal to a pre-set threshold value.

2. A sensor calibration device that calibrates a distance-measuring sensor that is mounted in a vehicle, comprising:
a calibratability determination portion that determines whether or not the distance-measuring sensor is in a calibratable state based on at least one of state of the vehicle and state of a road surface on which the vehicle is positioned; and
a calibration execution portion that determines a correction coefficient to calibrate the distance-measuring sensor when the distance-measuring sensor is determined to be in the calibratable state, the correction coefficients being determined based on a pre-found distance between the distance-measuring sensor and the road surface on which the vehicle is positioned, the calibration execution portion mathematically applying the correction coefficient to a detected value detected by the distance-measuring sensor to generate a corrected value, wherein:
the distance-measuring sensor is a distance image sensor at least a portion of whose detection region is the road surface,
the calibratability determination portion determines whether or not the distance image sensor is in the calibratable state based on a result of detection by the distance image sensor, and
the calibratability determination portion finds a variance of brightnesses detected by photosensitive cells that are contained in the distance image sensor, and determines whether or not the distance image sensor is in the calibratable state according to whether or not the variance is less than or equal to a pre-set threshold value.

3. A sensor calibration device that calibrates a distance-measuring sensor that is mounted in a vehicle, comprising:
a calibratability determination portion that determines whether or not the distance-measuring sensor is in a calibratable state based on at least one of state of the vehicle and state of a road surface on which the vehicle is positioned; and
a calibration execution portion that determines a correction coefficient to calibrate the distance-measuring sensor when the distance-measuring sensor is determined to be in the calibratable state, the correction coefficients being determined based on a pre-found distance between the distance-measuring sensor and the road surface on which the vehicle is positioned, the calibration execution portion mathematically applying the correction coefficient to a detected value detected by the distance-measuring sensor to generate a corrected value, wherein:
the distance-measuring sensor is a distance image sensor at least a portion of whose detection region is the road surface,
the calibratability determination portion determines whether or not the distance image sensor is in the calibratable state based on a result of detection by the distance image sensor,
each of photosensitive cells contained in the distance image sensor is set in a corresponding one of a plurality of pre-set divided regions, the calibratability determination portion, with regard to each of the divided regions, finds a variance of brightnesses detected by the photosensitive cells contained in a divided region, and determines whether or not the divided region of the distance image sensor is in the calibratable state according to whether or not the variance is less than or equal to a pre-set threshold value, and the calibration execution portion calibrates the divided region of the distance image sensor that is determined as being in the calibratable state by the calibratability determination portion.

4. The sensor calibration device according to claim 1, further comprising:

a correction coefficient storage portion that stores the correction coefficient for use for correcting a detected value from the distance image sensor, with regard to each of photosensitive cells contained in the distance image sensor, wherein the calibration execution portion calibrates the distance image sensor with regard to a plurality of brightnesses, and records in the correction coefficient storage portion a correction coefficient found as a result of calibration so that the correction coefficient is associated in correspondence with information about the brightness.

5. The sensor calibration device according to claim 1, further comprising:

a state detection portion that detects state of the vehicle, wherein the calibratability determination portion determines whether or not the distance-measuring sensor is in the calibratable state based on a result of detection by the state detection portion.

6. The sensor calibration device according to claim 5, wherein the state detection portion includes at least one of an acceleration sensor that detects acceleration of the vehicle, an inclination detection sensor that detects inclination of the vehicle, and a vehicle speed sensor that detects vehicle speed of the vehicle.

7. The sensor calibration device according to claim 6, wherein the inclination detection sensor detects at least one of yaw angle, pitch angle and roll angle of the vehicle.

8. A sensor calibration method that calibrates a distance-measuring sensor that is mounted in a vehicle, comprising:

determining whether or not the distance-measuring sensor is in a calibratable state based on at least one of state of the vehicle and state of a road surface on which the vehicle is positioned; and calibrating the distance-measuring sensor by determining correction coefficients to be mathematically applied to detected values detected by the distance-measuring sensor to generate corrected values, the correction coefficients being based on a pre-found distance between the distance-measuring sensor and the road surface on which the vehicle is positioned, when the distance-measuring sensor is determined to be in the calibratable state, wherein the distance-measuring sensor is a distance image sensor at least a portion of whose detection region is the road surface, and whether or not the distance image sensor is in the calibratable state is determined based on a result of detection by the distance image sensor, whether or not the vehicle is substantially parallel to the road surface is determined based on the result of detection by the distance image sensor, and the distance image sensor is determined to be in the calibratable state when the vehicle is substantially parallel to the road surface, and the vehicle is determined to be substantially parallel to the road surface when, regarding a plurality of pre-set photosensitive cells among photosensitive cells contained in the distance imaging sensor, an amount of change in distance detected by each of the pre-set photosensitive cells during a pre-set time is less than or equal to a pre-set threshold value.

9. The sensor calibration device according to claim 4, wherein the correction coefficient storage portion stores correction coefficients corresponding to at least two brightness levels for each of the photosensitive cells contained in the distance image sensor.

10. The sensor calibration device according to claim 9, wherein the correction coefficients include a slope and an intercept of a graph used to correct the detected value from the distance image sensor.

11. The sensor calibration device according to claim 6, wherein the acceleration detector detects vertical acceleration, a first horizontal acceleration and a second horizontal acceleration perpendicular to the first horizontal acceleration.

12. The calibration device according to claim 1, wherein the distance measuring sensor is a charged coupled device.

13. The calibration device according to claim 1, further comprising:

a light source that illuminates the road surface, wherein the image sensor receives light reflected by the road surface, and the calibratability determination portion determines whether or not the distance image sensor is in the calibratable state based on detection of the reflected light.

14. The calibration device according to claim 13, wherein the calibratability determination portion determines whether or not the distance image sensor is in the calibratable state by measuring a time of flight of light from the light source to the image sensor via reflection on the road surface.

15. The calibration device according to claim 13, wherein the light source is a light emitting diode.

* * * * *